United States Patent

Williams

[11] Patent Number: 5,255,967
[45] Date of Patent: Oct. 26, 1993

[54] COFFEE TABLE FOR RECYCLERS

[76] Inventor: Craig Williams, 5218 Boyd Ave., Oakland, Calif. 94618

[21] Appl. No.: 682,101

[22] Filed: Apr. 5, 1991

[51] Int. Cl.⁵ ............................................. A47B 63/00
[52] U.S. Cl. ..................... 312/193; 100/34; 211/50; 232/1 C
[58] Field of Search ...................... 312/330.1, 183, 193; 248/346, 505; 211/50; 206/83.5; 100/34; 232/1 C

[56] References Cited

U.S. PATENT DOCUMENTS

| | | |
|---|---|---|
| 3,382,794 | 5/1968 | Lindholm et al. ............ 100/34 |
| 3,912,047 | 8/1975 | Gamble . |
| 3,933,088 | 2/1976 | Passagno . |
| 4,059,222 | 3/1977 | Gamble . |
| 4,104,960 | 5/1977 | Kuhen . |
| 4,887,874 | 12/1989 | Joffee . |
| 5,028,099 | 7/1991 | Bertucco ............... 100/34 |

FOREIGN PATENT DOCUMENTS 0486871 4/1970 Switzerland ............ 100/34

Primary Examiner—Kenneth J. Dorner
Assistant Examiner—Gerald A. Anderson

[57] ABSTRACT

A coffee table with the added capacity to store daily newspapers after they have been read until they are bailed for recycling. The table is constructed with a drawer 15 divided into sections 16 which are sized to hold respective stacks of daily newspapers. The drawer sections 16 have bailing guides 29 attached to opposite section walls 28 to facilitate bailing of the newspaper.

1 Claim, 5 Drawing Sheets

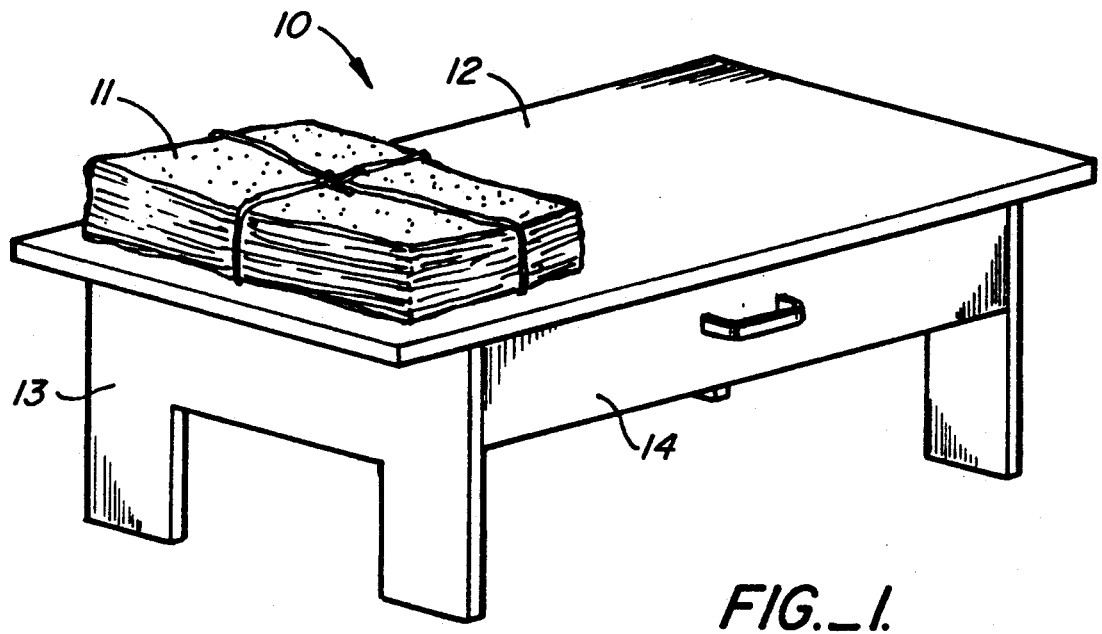
FIG._1.
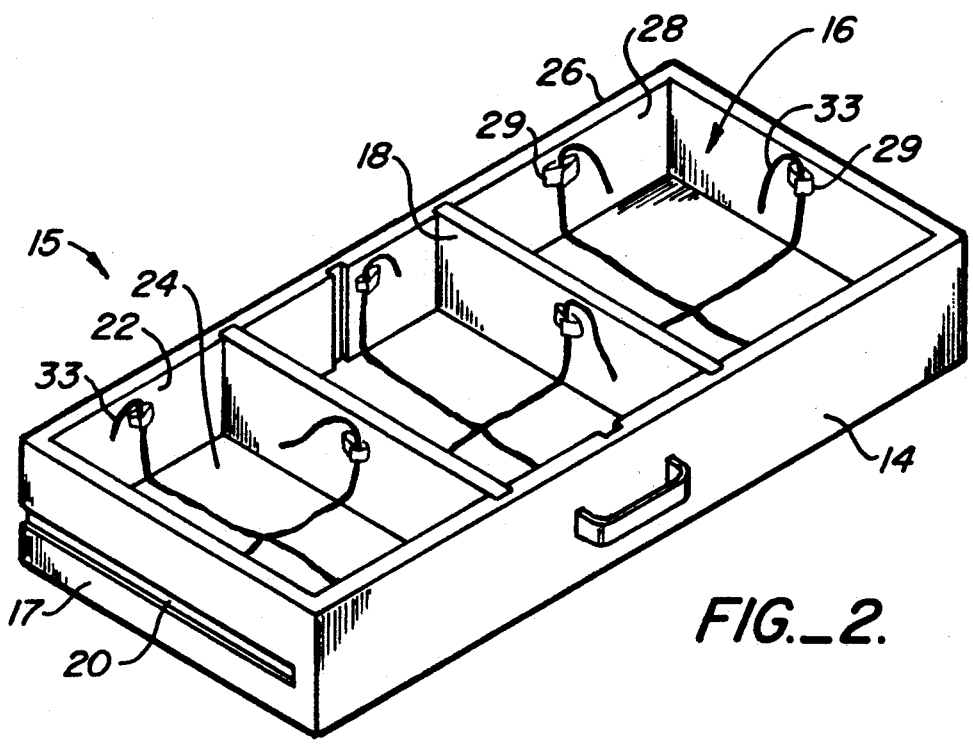
FIG._2.

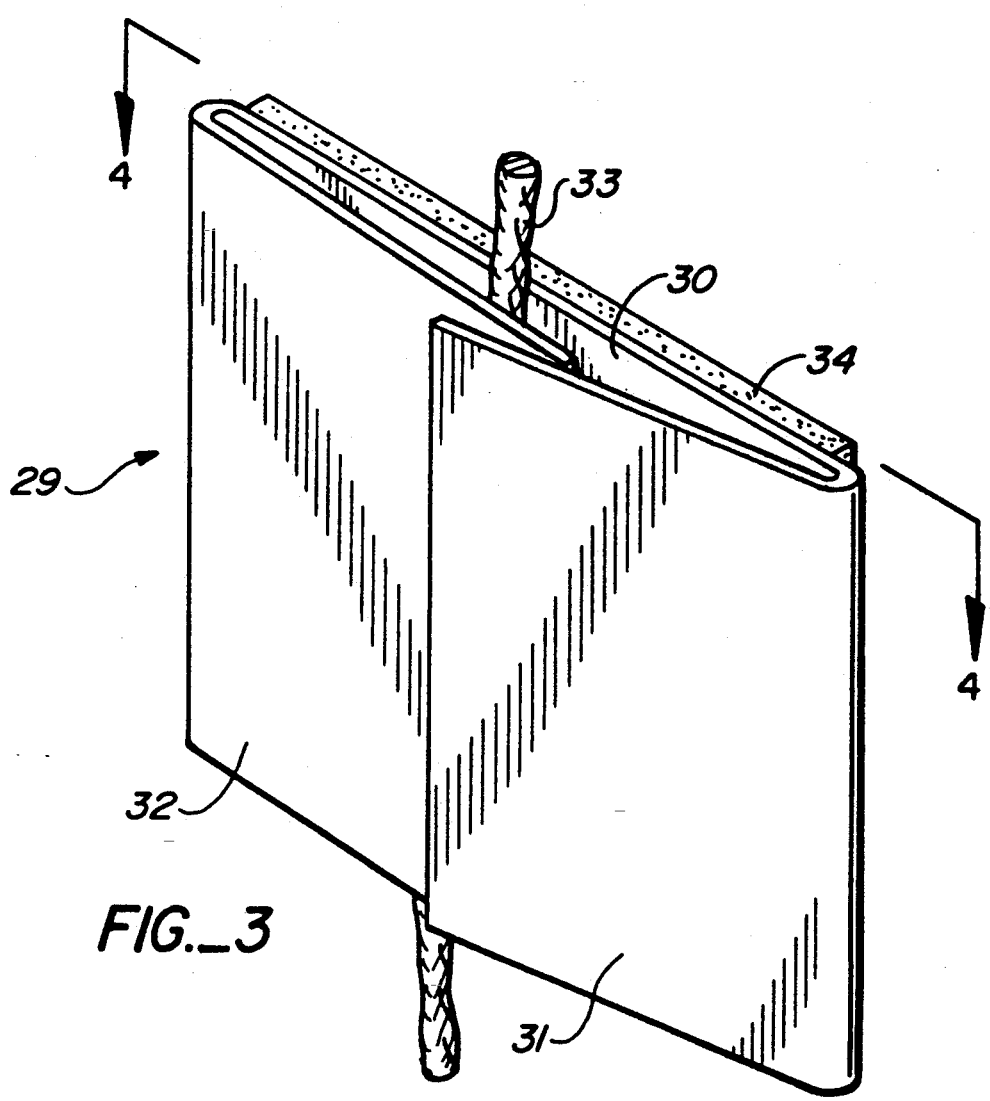
FIG._3
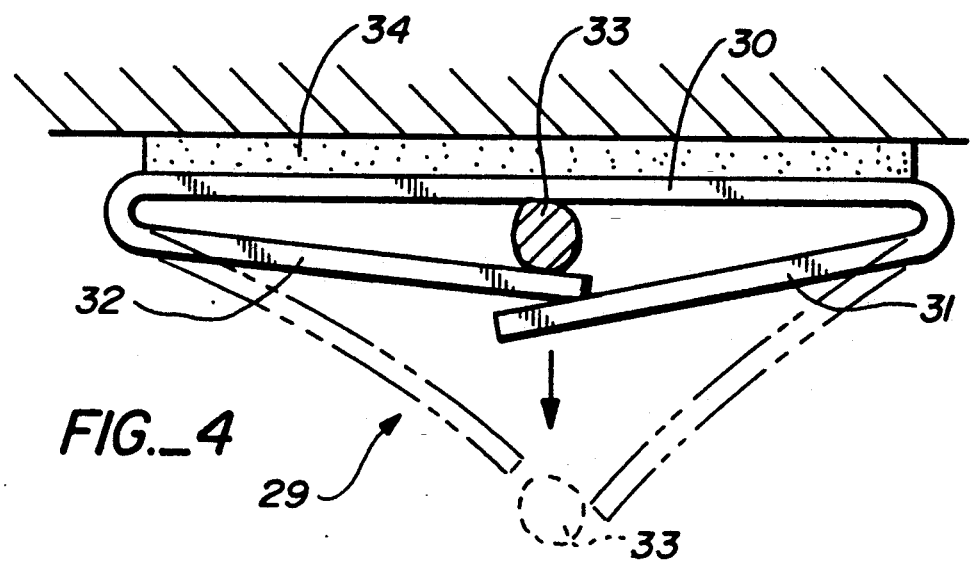
FIG._4

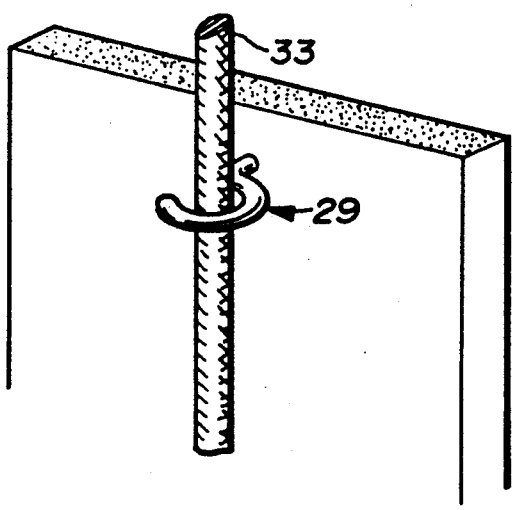
FIG._5
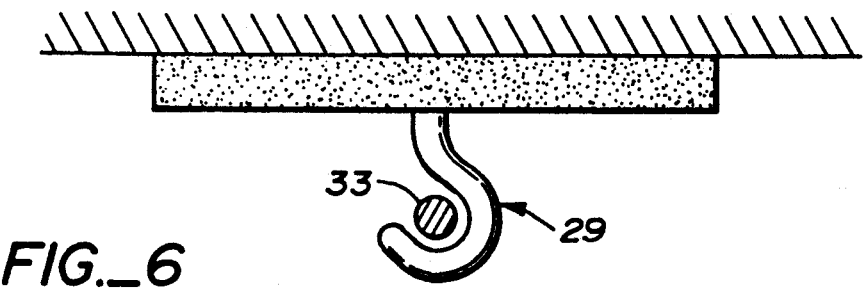
FIG._6
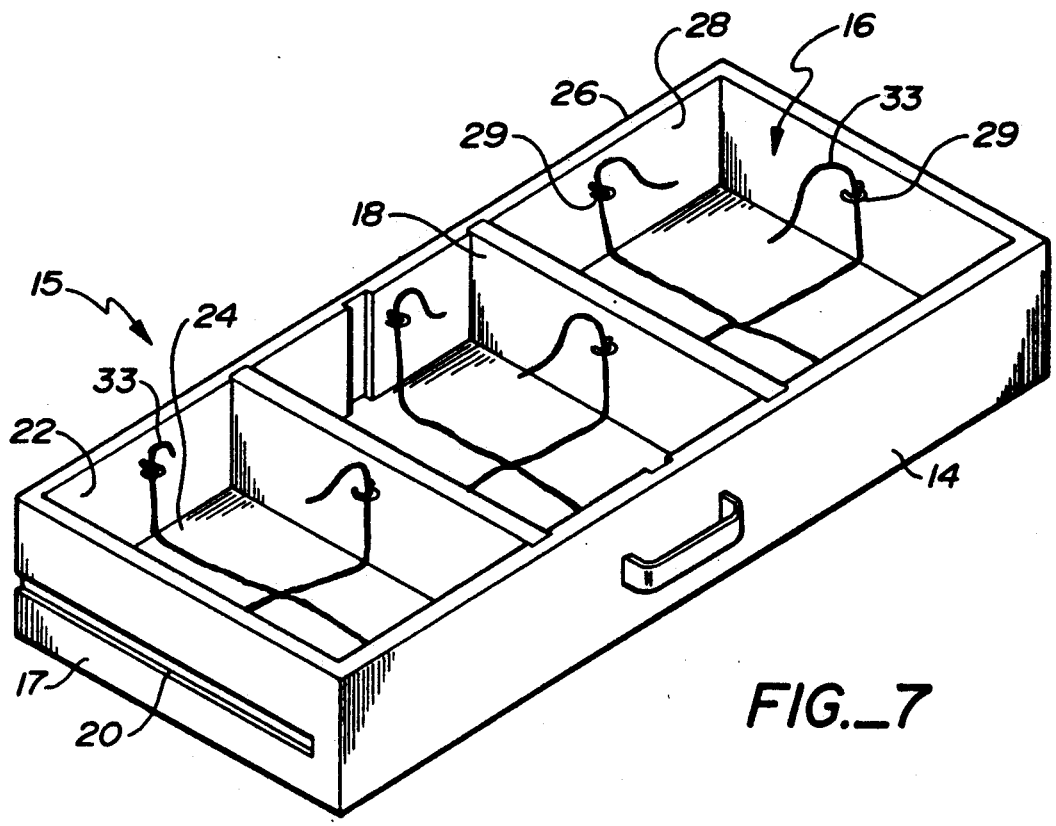
FIG._7

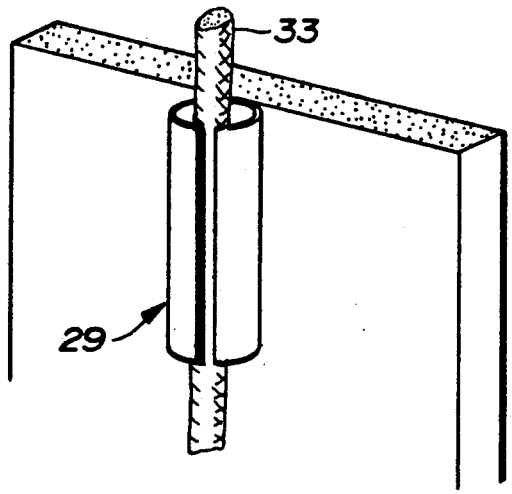
FIG._8
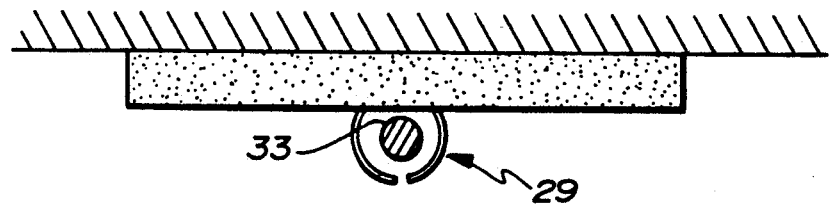
FIG._9
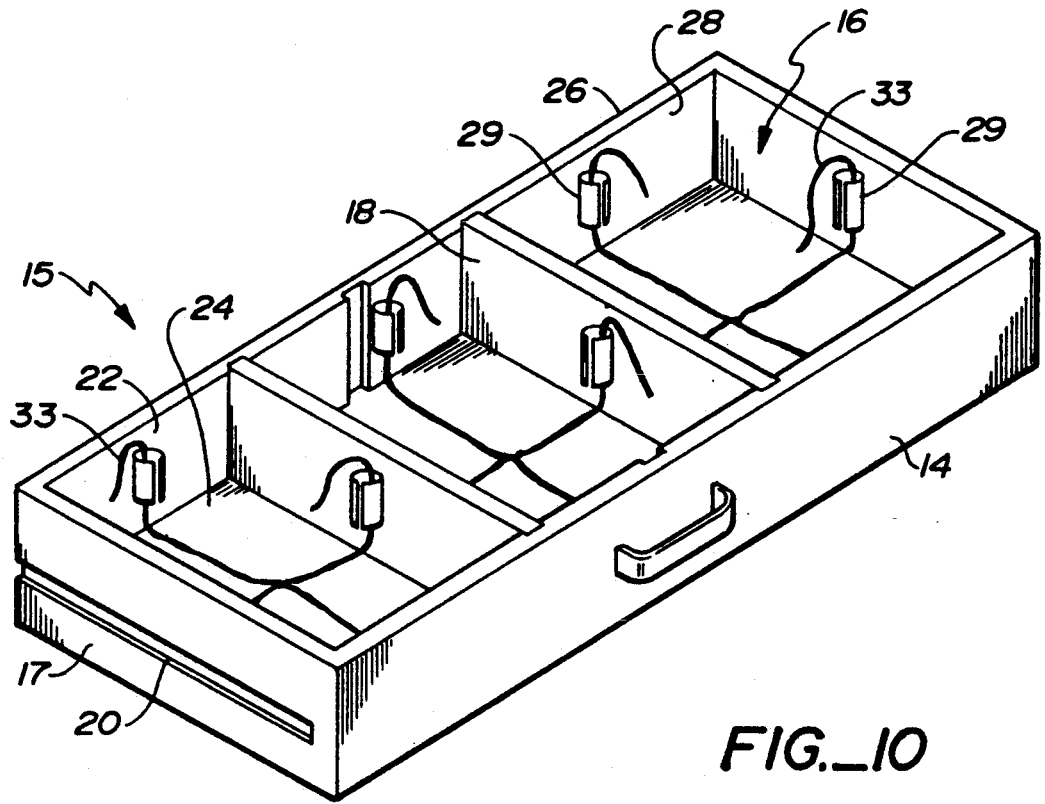
FIG._10

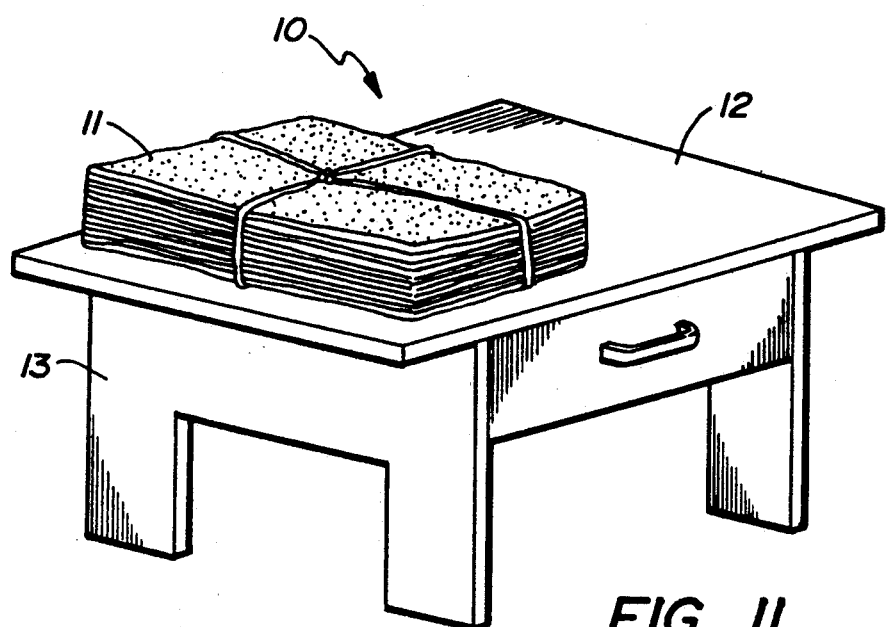
FIG._11
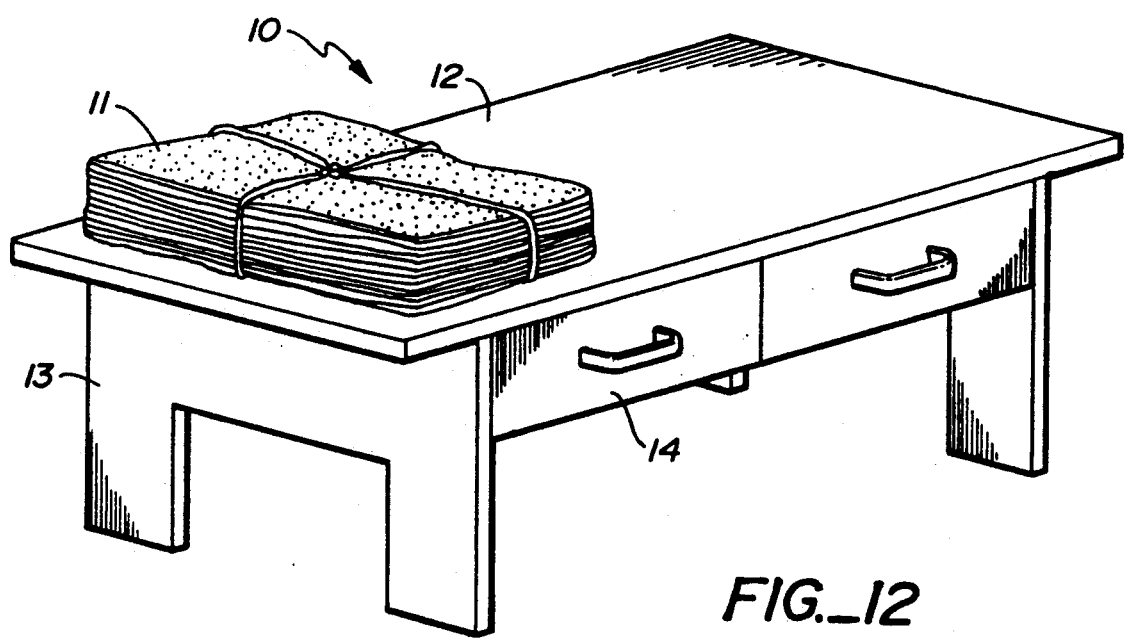
FIG._12

COFFEE TABLE FOR RECYCLERS

BACKGROUND

1. Field of Invention

The invention relates to furniture, specifically to a coffee table which can aid in recycling.

2. Description of Prior Art

Industrial society produces mountainous tonnage of waste. The E.P.A. reports that in 1988, 40% of the garbage produced in the U.S. can be attributed to paper and paperboard. Inventors have developed devices for storing and recycling both domestic and industrial discarded matter.

Scott Kuhen in 1977, showed an outdoor recycling structure in U.S. Pat. No. 4,104,960. The structure was garbage bin but was not conveniently located near to where people produce waste.

In 1975 and 1977, Bruce Gamble showed two apparatuses for holding and bailing newspapers, in U.S. Pat. Nos. 3,912,047 and 4,049,222. Both inventions were bags for holding newspapers but did not solve the problem of storing the papers until the papers were to be recycled.

A West German published patent application, 1947, 3,435,666 of Leo Prostler showed a kitchen cabinet system for storing domestic waste. The invention was convenient for food type waste, but wasn't located in an ideal place for sorting newspapers.

Mary Pessagno showed a newspaper and magazine storage device in U.S. Pat. No. 3,933,088 in 1974. The device was designed for holding newspapers and magazines for future reference without the expressed intent of recycling them eventually.

A drawer design was patented with a knock-down front for converting the drawer into a bin by Edward Joffe in 1989, U.S. Pat. No. 4,887,874. The knockdown front made removal of objects easier, but it was not intended for storing newspapers, nor did it aid in binding newspapers.

These inventions all serve a useful purpose yet they generally neglect to locate the recycling apparatus in the most convenient place. With regard to newspaper waste, a significant percentage of the population read the daily newspaper on a couch or chair situated near a coffee table in their living room. The coffee table frequently appears in a living room near a living room couch set because the height of a coffee table is approximately the same as the seat level of a couch or chair.

Like most other types of furniture, coffee tables have both a functional as well as an aesthetic dimension. A coffee table's functional purpose is usually for resting objects on its surface, such as drinks, knickknacks, books, etc. Some designs have small drawers for storing pens, notepads and other small objects.

OBJECTS AND ADVANTAGES

Accordingly, several objects and advantages of the invention are:

(a) to provide a storage area and binding apparatus close to where many people read the daily newspaper, unlike other recycling devices which are away from the point at which the read newspaper becomes waste;

(b) to provide storage space within an existing piece of furniture which does not detract from the existing living room decor;

(c) the recycler's coffee table transforms what is almost always unused space under the coffee table into a useful and convenient storage area;

(d) to provide a binding device which allows one to easily center the stack of papers and tie them into a secure bundle;

(e) the drawer provides an inexpensive additional feature of a recycling storage area to a coffee table.

Further objects and advantages are to provide a convenient way to reduce newspaper clutter and to also store away newspapers for short terms, yet in a manner where they can be retrieved for reference.

BRIEF DESCRIPTION OF THE DRAWINGS

FIG. 1 is a perspective view of the invention.

FIG. 2 is a perspective view of the drawer of the invention of FIG. 1.

FIG. 3 is a perspective view of the bailing guide of the invention.

FIG. 4 is a lateral view of the bailing guide of FIG. 3.

FIGS. 5, 6 and 7 show a first alternative bailing guide for use in the invention.

FIGS. 8, 9 and 10 show a second alternative bailing guide for use in the invention.

FIG. 11 shows a alternative to the invention of FIG. 1 in which a single stack of magazines fills a drawer.

FIG. 12 shows a alternative to the invention of FIG. 1 in which two separate drawers are fitted to the table.

REFERENCE NUMERALS IN DRAWINGS

10: table
11: stack of newspapers
12: tabletop
13: side of table
14: drawer front
15: drawer
16: drawer section
17: drawer side
18: drawer dividers
20: drawer slide
22: back of table
24: drawer bottom
26: drawer back
28: section wall
29: bailing guide
30: guide backing
31: right flap of guide
32: left flap of guide
33: left flap of guide.

DESCRIPTION OF INVENTION

A table in accordance with my invention is shown in FIG. 1. It has a top 12 which can be of various dimensions, the most common being 122 cm by 61 cm and 104 cm by 104 cm.

The table is structured so that top 12 is connected to sides 13 of the table and back panel 22. The sides of the table are of a standard height ranging from 41 cm to 46 cm. The sides are connected to back panel 22 which is the same design and size as a drawer front 14. The most common dimensions of back panel 22 are 15 cm by 107 cm for a 122 cm by 61 cm top 12. All of parts top 12, the sides 13 and back panel 22, are connected. This can be done in a variety of ways screws, plates, and gluing being the easiest. The three parts combined form an open frame or holder in which a drawer 15 is installed.

A drawer 15 as shown in FIG. 2 can be of various dimensions, the most common being 15 cm by 42 cm wide. The width of drawer 15 is 34 cm wide to accommodate to standard size daily newspaper, which is 34 cm wide. Drawer 15 has a plurality of drawer sections 16, each being 33 cm by 38 cm. Sections 16, are created by spacing drawer dividers 18 between drawer front 14 and drawer back 25. Dividers 18 are 15 cm by 38 cm. Drawer 15 is made of several parts, including drawer front 14 which is connected to drawer sides 17, which are at least 15 cm by 42 cm. Sides 17 are connected to drawer back 25, which is the same dimensions as drawer front, in this case 15 cm by 107 cm. The drawer 15 has a bottom which is joined to drawer front 14, drawer sides 17 and drawer back 26 which is 105 cm by 39 cm. As shown in FIG. 2 drawer 15 is connected to the table with a two part, male and female drawer slide 20, connected to both table side 13 and drawer side 17.

Inside each drawer section 16, as shown in FIG. 2, are bailing guides 29. The guides, as shown in FIGS. 3 and 4, consist of several parts including a left flap 32, a right flap 31, and a back 30. The guides are made of a flexible plastic so that a string 33 can be both positioned in the guides, as well as pulled form the guides when it is time to bail a stack 11 of newspapers. Backing 30 is 3 cm by 5 cm. The flaps overlap and are 2 cm by 5 cm. There are eight guides per drawer section 16. Two are centered on each of the four interior walls of each drawer section 16. They are located 3 cm from the top and bottom of each drawer section wall 28. The string 33 should be of sufficient strength for bailing and holding a stack of newspapers.

Since each drawer section 16 is determined by the size of a standard size daily newspaper, the drawer section 16 determines the size of the drawer 15 depending on the number of drawer sections 16. Newspapers are printed on standard size sheets of paper which are 57 cm by 69 cm. These sheets produce four printed pages of news. The paper is then folded over for easy carrying to a size of approximately 29 cm by 34 cm. The approximation is due to the fact that the paper consists of a varying number of pages from day to day. Each drawer section is 33 cm by 38 cm to accommodate the approximate 29 cm by 34 cm dimensions of a folded paper. A table top measuring 122 cm by 61 cm has three sections normally and a table top of 104 cm by 104 cm has two sections 16, the size of a standard daily newspaper determining the section size.

Prior to storing the newspapers the user runs two pieces of string 33 through the bailing guides 29. One string 33 should be at least 110 cm and the other at least 96 cm long. These will accommodate the sides of drawer section 16 which are 38 cm and 33 cm, respectively. The guides are centered in the drawer section walls 28 so that the strings crisscross over drawer bottom 24. This centering process balances the stack of newspapers for bailing.

OPERATIONS, FIGS. 1 THRU 12

In FIGS. 1 and 2 the table functions like other coffee tables in that it provides a surface area for resting drinks, books, and other objects on its top 12. Its uniqueness and usefulness stem from its capacity as a storage area for daily newspapers that will eventually be recycled. The storage area is drawer 15. The user pulls drawer 15 open when it is desired to store the daily newspaper. The paper fits into a drawer section and the person then simply closes the drawer 15.

The papers are also readily available for reference at this point since the stacks are accumulating in a chronological order.

When the stack of papers in the drawer reaches the top of section wall 28, it is an appropriate time to bail the papers. The individual then pulls the ends of the string 33 up and ties the stack 11 of papers on the top of the stack. Then the bailed stack of papers can be conveniently lifted out of drawer 15 to a suitable recycling center.

When the user wants to reset drawer 15 for a new stack of daily newspapers, he or she runs two pieces of string 33 through the bailing guides.

Numerous variations exist for the table top 12, the drawer structure 15 and the bailing guides 29. FIG. 11 shows a square top 12. FIG. 12 shows a table with two drawers 15. In this case the slides 20 would be attacked to the underside of the tabletop 12 or a system of runners and rails could be built into the top 12 and side 13. The bailing guide 20 can also take in a variety of forms including eyelets FIGS. 5-7 and tubular shaped guides FIGS. 8-10.

SUMMARY, RAMIFICATIONS, AND SCOPE

The present coffee table augments the ability of people to recycle their daily newspaper by providing a coffee table which can aid in recycling while still having an aesthetic quality. Environmental scientists argue that the best place to reduce waste is at the point at which it is produced instead of shipping it over long distances or dumping it into the ground. In a similar fashion, the coffee table drawer is designed to hold stacks of paper for recycling at the source where the newspapers becomes used or waste. The coffee table also makes use of space under the table top which with conventional coffee tables is very rarely used.

Although the description above contains many specificities, these should not be construed as limiting the scope of the invention but merely providing illustrations of some of the presently preferred embodiments of the invention. For example, the bailing guides may have other shapes, such as eyelets, tubular shaped plastic, a one flap guide. The guides can be made of other materials such as metal, wood or hook and loop fasteners.

Thus the scope of the invention should be determined by the appended claims and their legal equivalents, rather than by the examples given.

I claim:

1. A recycler's coffee table, comprising,
   (a) a flat top of rigid material at least 104 cm by 61 cm in size,
   (b) a plurality of side support members of equal height,
   (c) means for joining said support members at equal angles at spaced locations to the underside of said top so as to be able to support top in a horizontal position,
   (d) a drawer for storing newspapers, said drawer having a bottom at least 42 cm by 71 cm, said drawer having an inner wall,
   (e) means for attaching said drawer between and to said support members so as to enable user to open and close said drawer,
   (f) means dividing said drawer into a plurality of sections, each section being at least 34 cm by 29 cm for holding respective stacks of newspapers, and
   (g) a plurality of guides attached to said inner wall of said drawer, said guides being arranged to guide a string across the bottom and up the opposite sides of said drawer for enabling a user to tie a stack of newspaper in said drawer.

* * * * *